CRYSTAL FILTERS FOR MULTIFREQUENCY SOURCE

Filed July 13, 1960 2 Sheets-Sheet 1

INVENTOR.
JOHN E. R. HARRISON
BY
[signature]
ATTORNEY 3,054,968
Patented Sept. 18, 1962

3,054,968

CRYSTAL FILTERS FOR MULTIFREQUENCY SOURCE

John E. R. Harrison, Rochester, N.Y., assignor to General Dynamics Corporation, Rochester, N.Y., a corporation of Delaware Filed July 13, 1960, Ser. No. 42,533
6 Claims. (Cl. 331—76)

This invention relates to frequency synthesizers comprising a reference frequency and spectrum generator and filter circuits from which may be derived and selected any one of a plurality of frequencies.

The problem in designing multifrequency sources with piezoelectric crystal accuracies lies in the relatively high cost of the crystals. Where a precision ground crystal must be employed for each predetermined frequency desired, the costs can mount considerably. The cost problem is particularly acute when the frequencies of several crystals must be precisely digitally related as in the digitally tuned superheterodyne transmitter-receiver of the type disclosed in the copending application, Serial No. 42,698, filed July 13, 1960, entitled "Digitally Tuned Transmitter-Receiver" and assigned to the assignee of this application. There, digitally related injection frequencies are required for single sideband equipment.

The principal object of this invention is to design an improved multifrequency source employing a single high precision reference source, the accuracy of which may be reflected in a large number of related output frequencies.

A more specific object of this invention is to design an improved frequency source from which may be obtained a large number of precisely accurate frequencies by simple switching operations.

The objects of this invention are attained by generating a comb-type spectrum of frequencies in a pulse generator excited by a single narrow-tolerance reference source. A series of wide-tolerance low cost crystals are selectively connected in circuit, one-by-one, by a switch, the switch being so constructed and arranged as to shunt to ground the undesired frequencies through the unused crystals.

Other objects and features of this invention will become obvious to those skilled in the art by referring to the specific embodiment described in the following specification and shown in the accompanying drawings, in which.

Figure 1:
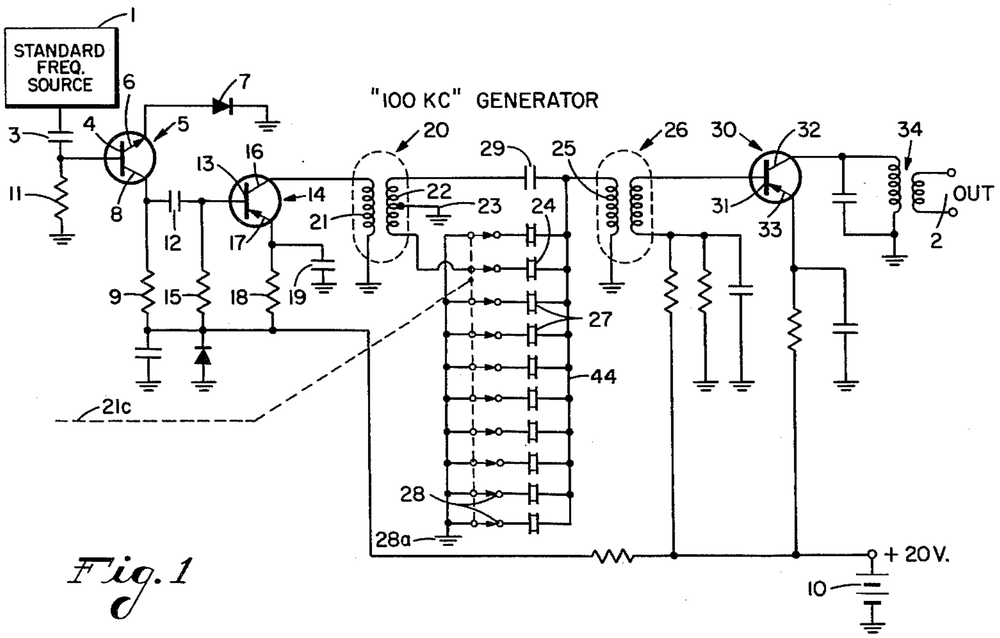
FIG. 1 is a schematic circuit diagram of said embodiment.

At 1 is shown the standard frequency source which may comprise a finely ground piezoelectric crystal in a temperature-controlled oven. At the output of the reference source may be expected a relatively pure wave having a frequency accuracy over long periods of time of one part in several million. At the output 2 of the system is obtained, according to this invention, any one of a large number of frequencies, all of which are numerically-related to the reference frequency and faithfully reflecting the accuracy of reference frequency source 1. The numerical relation, in the specific example considered here, is decimal.

The reference frequency source 1 is applied through coupling condenser 3 to the base 4 of the transistor 5. This transistor, in the example shown, is of the N-P-N type with the emitter 6 connected through diode 7 to ground. The collector 8 is connected through the load resistor 9 to the positive terminal of potential source 10. The alternating reference wave appears across the input resistor 11 and drives the base into conduction. The positive-going portion of the reference wave fed to the base 4 increases in amplitude in the emitter until a voltage equal to the forward breakdown voltage of diode 7 is reached. At this voltage, current begins to flow through the base-to-emitter junction of transistor 5 and is amplified at the collector junction. The fractional sine wave pulse formed in transistor 5 is fed through the small differentiating capacitor 12 to the base 13 of transistor 14, where a function similar to that in transistor 5 is performed. In this case, the negative-going spikes appearing across input coupling resistor 15 is amplified in the circuit of the collector 16 of transistor 14. Because of the greatly increased amplitude of the input signal in the collector, the turn-on action is amplified so that the collector pulse rise time may easily be made as short as 0.1 microseconds.

The emitter 17 of the transistor, which is of the P-N-P type, is connected through load resistance 18 to voltage source 10. The high frequency by-pass condenser 19 is connected between the emitter and ground, as shown.

Figure 3:
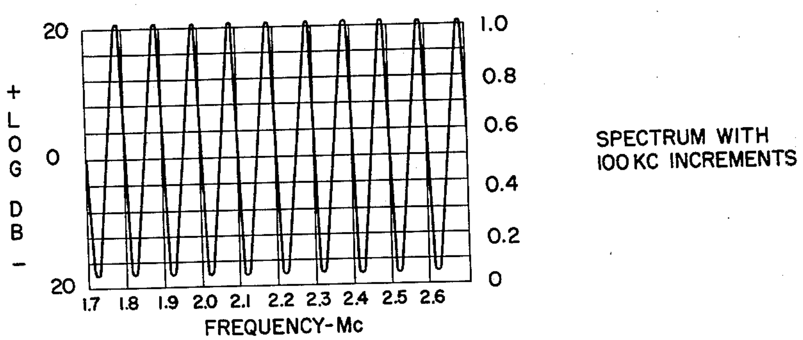
FIGS. 3, 4, 5 represent a set of waveforms illustrating the frequency characteristics of the circuit of FIG. 1.

The steep wave front of the pulse in the collector is applied to the hybrid filter toroid 20 to produce ringing. The primary winding 21 of the toroid is connected between the collector 16 and ground, while the secondary winding 22 has an intermediate tap 23 connected to ground. The toroid may comprise any commercially obtainable soft iron core with a low reluctance magnetic circuit and with low resistance windings and minimum damping. The spectral response of the over-coupled coil windings is relatively flat and covers a wide band of high frequencies. It has been found that where the reference frequency source 1 is 100 kilocycles per second, the high frequency spectral response is substantially that shown in FIG. 3 with repetitive peaks, as in a comb, appearing at 100 kc. intervals. It has been found that this spectral response between 1.7 and 2.6 megacycles is flat to within 1 db. The relatively low Q of the circuit at the output of transistor 14 maintains this flat relationship for these desired frequencies but does attenuate the 100 kc. fundamental by about 12 db.

The entire spectrum appears at the lower end of the secondary winding 22 and is applied serially through crystal 24 to one end of primary winding 25 of the second toroidal transformer 26. The opposite end of the primary winding 25 is grounded. A desired number of additional crystals 27 of different frequencies are situated side-by-side with the connected crystal 24. One terminal of all crystals are connected in parallel and to the upper end of winding 25, while the other terminals of all crystals, except the one crystal 24, are connected through switch contacts 28 to ground. It will now be seen that the contacts 28 ground each of the crystals 27, while the crystal 24 is connected in series between the two toroids 20 and 26.

Inasmuch as the secondary winding 22 is tapped intermediate its ends and grounded, the phases of the voltages at the terminals of the winding 22 are opposed. The winding 22 may now be used to split the phase of the input signal. The signal passes through the series-connected crystal 24 and its leakage capacity to winding 25. This leakage capacity is neutralized or canceled by the 180° out-of-phase voltage adjusted by the phasing capacitor 29 to be equal to the resultant total capacity appearing at the opposite terminal of the winding. The effective spectral response of the connected crystal, accordingly, is devoid of shunting capacity effects and is as sharp as the crystal. Preferably, the crystal's mechanical capacity is selected such that the bandpass of the crystal is in excess of any expected temperature or aging drift. Transistor 30 is an isolation amplifier between the filter and the output 2. Transistor 30 with base 31, collector 32, and emitter 33 of the P-N-P type is coupled between coupling transformer 26 and output transformer 34.

Figure 4:
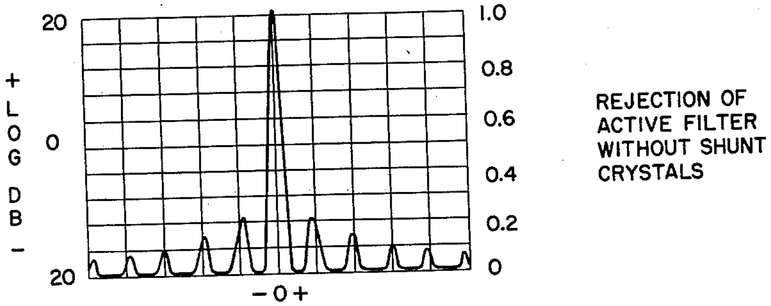
Figure 5:
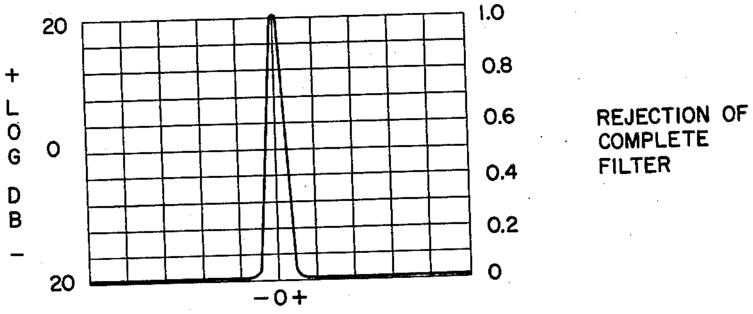

The unused crystals 27 are, according to an important feature of this invention, inserted by special switch mechansim as shunt traps to provide further rejection to the undesired portions of the spectrum of frequencies. Even where the natural frequencies of the several crystals 24 and 27 are all closely related, the rejection of the undesired frequencies is excellent. As shown in FIG. 4, the amplitude of the undesired frequencies passing through the connected crystal 24 may be substantial. When, however, the shunt crystals are connected as shown, the frequencies passed by the connected crystal is completely free of spurious signals, as shown by the characteristic curve of FIG. 5.

Figure 2:
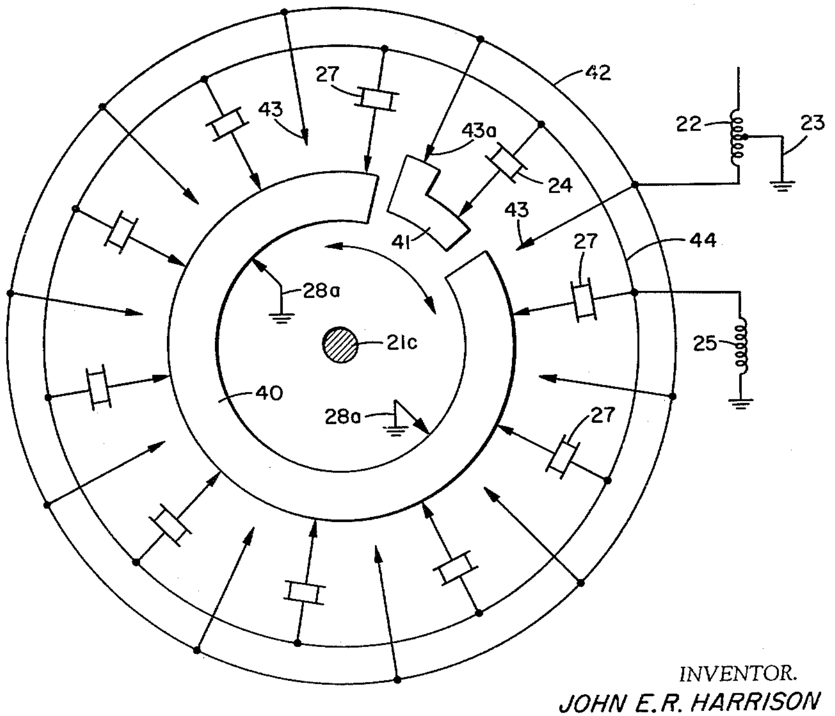
FIG. 2 is a perspective view of one switch mechanism for switching crystals of FIG. 1.

Numerous switch arrangements may be devised for grounding all of the crystals 27 except the connected crystal 24. One such switching arrangement is suggested in FIG. 2 where the commercially-available wafer-type switch is employed. In FIG. 2 is shown the movable parts of the switch structure comprising the annulus 40 and the segment 41 driven by actuating shaft 21*c*. The arrowheads in FIG. 2 describe the concentric circles in which contact is made with the annulus and the segment. As shown, the lower end of input winding 22 of the spectrum generator is connected through conductor 42 to all of the contacts 43. Only one contact 43*a*, however, engages segment 41 and hence connects through crystal 24 to the conductor 44, which is in turn connected to the upper end of output winding 25. Means is thus provided for selecting at will any one of the dominant frequencies of the spectrum generator, said means comprising a plurality of narrow band-pass filters resonant, respectively, to said dominant frequencies and switch means for connecting the selected one of said filters in the signal circuit between the spectrum generator and the output circuit. This selecting switch means shunts the filters of the frequencies adjacent the frequency of the selected filters across the signal circuit to sharply attenuate all frequencies adjacent the selected one frequency.

Ideally, the crystals are selected to resonate at the dominant frequencies only which are, of course, multiples of the reference frequency source 1. By merely rotaing the shaft 21*c*, digitally-related frequencies can be made to appear at the output 2, each of the frequencies having the accuracy and narrow tolerance of the preferably oven-controlled reference frequency source 1.

Many modifications may be made in the subject invention without departing from the scope of the invention as defined in the appended claims. For example, the spectrum source for exciting toroid 20 may assume many configurations known in the art. Likewise, other switch structures or logical switching circuits may be employed for selectively taking any one of the crystal filters out of the shunting or grounding circuit and connecting it in the signal circuit.

What is claimed is:

1. A system for generating a plurality of decimally-related frequencies, the tolerance of each frequency being within predetermined relatively narrow limits, a reference frequency source, said source having a frequency tolerance within said predetermined limits, a spectrum generator coupled to and stimulated by said reference source for generating a spectrum of frequencies including uniformly spaced frequency components of dominant amplitudes, the frequency spacing between adjacent dominant frequencies corresponding to the frequency of said reference source, means for selecting at will any one of said dominant frequencies, said means comprising a plurality of narrow band-pass filters resonant, respectively, to said dominant frequencies, an output circuit, and switch means for connecting a selected one of said filters between said spectrum generator and said output circuit and for connecting the filters of frequencies adjacent the frequency of the selected filter in shunt across said output circuit to sharply attenuate all frequencies adjacent the selected one frequency.

2. In combination, a spectrum generator, a winding, means for inducing the spectrum of said source on said winding, an intermediate point of said winding being connected to a reference ground, an output circuit, a plurality of crystals, switch means for selectively connecting said crystals between one terminal of said winding and said output circuit, said switch means having contacts for reference grounding each of the crystals not selected for providing a low impedance shunt to ground of all frequencies resonant to said other crystals.

3. In combination, a reference frequency source, a pulse generator coupled to said source for generating a comb spectrum containing multiples of the frequency of said source, a transformer with a primary winding coupled to said spectrum source and with a secondary winding, said secondary winding having an intermediate grounded tap, a plurality of parallel crystals, switch means for selectively connecting any one of said crystals between one terminal of said secondary winding and an output conductor, said switch means having contacts for connecting each of the unselected crystals between ground and said output conductor, and a neutralizing condenser connected between the other terminal of said secondary winding and said output conductor.

4. A system for generating a plurality of decimally-related frequencies comprising a standard frequency source, a first amplifier, a diode in the output circuit of said first amplifier, the input of said first amplifier being coupled to said source for driving said diode into conduction repetitiously at the frequency of said source, a second amplifier, a differentiating circuit coupled between the two mentioned amplifiers for producing an output rich in harmonics, a toridal ringing transformer, the primary winding of said transformer being coupled in the output of said second amplifier, a signal output circuit, a plurality of narrow-band band-pass filters, the center frequencies of said filters being uniformly spaced an amount corresponding to the frequency of said standard frequency source, switch means for coupling selectively at will any one of said filters in the signal circuit between the secondary winding of said transformer and said output circuit, said switch means being constructed and arranged to connect the remaining unselected filters in shunt across said signal circuit.

5. A system for generating a plurality of numerically-related frequencies comprising a standard frequency source, a spectrum generator coupled to said source, said spectrum generator comprising means for producing sharp voltage spikes at the frequency of said source, a hybrid filter toroid with a primary winding coupled to said spectrum generator to produce ringing at the frequencies contained in said voltage spikes, a signal circuit coupled to the secondary winding of said toroid, a plurality of crystal filters, switch means for selectively connecting any one of said filters in series in said signal circuit and for connecting the unselected filters in shunt across said signal circuit.

6. A system for generating a plurality of numerically-related frequencies comprising a standard frequency source, a spectrum generator coupled to said source, said spectrum generator comprising means for producing sharp voltage spikes at the frequency of said source, a hybrid filter toroid with a primary winding coupled to said spectrum generator to produce ringing at the frequencies contained in said voltage spikes, an output signal circuit coupled to the secondary winding of said toroid, a plurality of filters, means for selectively connecting any one of said filters in series in said signal circuit and for connecting the unselected filters in shunt across said signal circuit.

References Cited in the file of this patent

UNITED STATES PATENTS

| | | |
|---|---|---|
| 1,833,966 | Fetter | Dec. 1, 1931 |
| 1,851,091 | Fetter | Mar. 29, 1932 |
| 2,402,385 | Eaton | June 18, 1946 |
| 2,405,999 | Collar et al. | Aug. 20, 1946 |
| 2,484,763 | Sturm | Oct. 11, 1949 |